March 31, 1970 A. M. PATEL ET AL 3,504,356

MAGNETIC MEMORY SENSE AMPLIFIER

Filed Jan. 13, 1967

INVENTORS
ARVIND M. PATEL
JOHN W. SUMILAS

BY W. Robertson
ATTORNEY

United States Patent Office 3,504,356
Patented Mar. 31, 1970

3,504,356
MAGNETIC MEMORY SENSE AMPLIFIER

Arvind M. Patel, Boulder, Colo., and John W. Sumilas, Wappingers Falls, N.Y., assignors to International Business Machines Corporation, Armonk, N.Y., a corporation of New York Filed Jan. 13, 1967, Ser. No. 609,183
Int. Cl. G11c *7/06*
U.S. Cl. 340—174 3 Claims

ABSTRACT OF THE DISCLOSURE

In a memory sense amplifier having a delay line connected across balanced sense wires for suppressing noise voltages and enhancing signal voltages, a transmission line approximation is made up of discrete elements.

Introduction—Background

A familiar ferrite core memory for a data processing system illustrates the problems that the sense amplifier of this invention is intended to overcome. A core is made in a toroid shape and can be magnetized in one direction around its circumference to represent a binary one or in the other direction to represent a zero. The operation of magnetizing the core for storage is called a write operation. In a read operation a core is driven to be magnetized in its zero representing direction. If the core was originally in a one signifying direction, it goes through a flux change as it switches to its zero direction and it produces a voltage associated with the flux change. A core originally in its zero signifying state does not go through this flux change and it produces no voltage during a read operation. A sense wire is threaded through the core to pick up this voltage. Its ends are connected to a sense amplifier which amplifies the small core signal to a level that is useful elsewhere in the system.

Noise on the sense wire makes the core signal difficult to detect. One source of noise is the currents that are used for switching the cores during the read and write operations. In a specific memory that will be described later, these currents are carried on two wires called a word wire and a bit-sense wire. The word wire carries currents during both the read and the write operations. The bit-sense wire has two functions. During a write operation it selectively carries a bit current that establishes whether a particular core is to be magnetized to its one signifying state. During read, it carries a bit current that cooperates with the word current to select a particular group of cores called a word. During read it also carries the core signal. In such a memory, the sense amplifier has the difficult problem of separating the core signal from the bit current. This problem is particularly serious because the bit current is much larger than the core signal. One object of this invention is to provide a new and improved sense amplifier for a memory of this type.

A related problem occurs in memories that have separate bit and sense wires. The two wires are closely coupled capacitively and inductively, and currents on the bit wire produce large noise voltages on the sense wire. A second related problem occurs in memories in which the bit wire is energized only during a write operation and not during a read operation. The noise produced during a write operation dies out rather slowly and persists into the time for the next read operation.

To summarize what has been described so far, the sense wires are generally not at ground potential when the core signal arrives at the sense amplifier. The very small core signal rides on top of a large noise voltage. In addition, the sense amplifier itself can contribute a similar effect. This problem is called "D.C. restore." A sense amplifier is ordinarily A.C. coupled, that is, it has capacitors or inductors that couple stages of the amplifier and isolate each stage from D.C. levels of the other stages. In response to the noise voltage, these reactances charge up to a high level; they discharge rather slowly and thereby tend to lengthen the effect of the noise voltages. Another object of this invention is to provide a new amplifier with improved D.C. restore.

Background—The prior art

When a memory is operated slowly enough, most of the noise voltages die out according to the time constants of the circuits before the signal appears. Most memories to some extent use this technique to overcome the effects of noise. But to the extent that the noise voltages can be suppressed, the memory can be operated faster. Thus an improved sense amplifier is a very important goal.

Several techniques for suppressing noise voltages are based on the fact that the noise voltage is considerably longer in time than the core signal. Frequency discriminating networks are often connected in the circuit to suppress the lower frequency noise voltages and transmit the higher frequency signal voltages. One useful frequency discriminating network is a transmission line. A transmission line is a circuit that is particularly adapted for transmitting pulses that are shorter in width than the length of the line. When the line is made the suitably arranged length it transmits pulses of the width of the core signal and it appears as a short circuit to the noise pulses since they are much longer. For example, a transmission line can be connected in the collector circuit of a transistor in the sense amplifier. The line tends to keep the collector terminal at a fixed potential except for signals that are not more than twice the length of the line. The line is made half as long as the core signal and it reflects the signal to the collector terminal to produce an output that is twice as wide as the original signal.

An object of this invention is to provide an improved circuit of this general type. One difficulty of the known prior art has been that each sense amplifier requires two transmission lines. One object of this invention is to provide an improved circuit that requires only one line for each sense amplifier. This goal is important because transmission lines are expensive and bulky.

In the sense amplifier of this invention, the core signal is transmitted on two wires that are balanced with respect to ground. Both a core signal and noise voltages appear in opposite polarities on the two wires. (That is, the two wires are part of a loop that these currents flow around.) A transmission line is connected across the two wires. This transmission line causes the voltage on either wire to appear slightly later on the other wire. Since the voltages on the two lines are opposite in polarity, they tend to cancel when they are combined on one wire. For example, suppose that the noise voltage is a wide rectangular pulse. When such a signal is combined with the delayed signal of opposite polarity, the result is a small pulse of one polarity that corresponds to the uncancelled portion of the undelayed pulse, a wide interval of zero voltage where the two signals cancel, and a short pulse of the opposite polarity corresponding to the uncancelled portion of the delayed pulse. Thus the circuit in effect differentiates the signal.

The line is made the appropriate length for the core signal and the delayed core signal to not cancel but to occur in closely spaced succession. Preferably, the line is as long as the width of the core signal. The usual noise voltage pulse is wide enough that the portion of the noise signal near the core signal is cancelled. The pulses at the beginning and end of the differentiated noise pulse can be eliminated by a known technique called strobing.

The foregoing and other objects, features and advantages of the invention will be apparent from the following more particular description of a preferred embodiment of the invention, as illustrated in the accompanying drawings.

Summary of the invention

This invention provides an improved delay device in the form of a two terminal filter constructed of discrete inductors and capacitors, as will be explained in the description of the preferred embodiment of the invention.

The drawing

The preferred embodiment—Introduction

Figure 1:
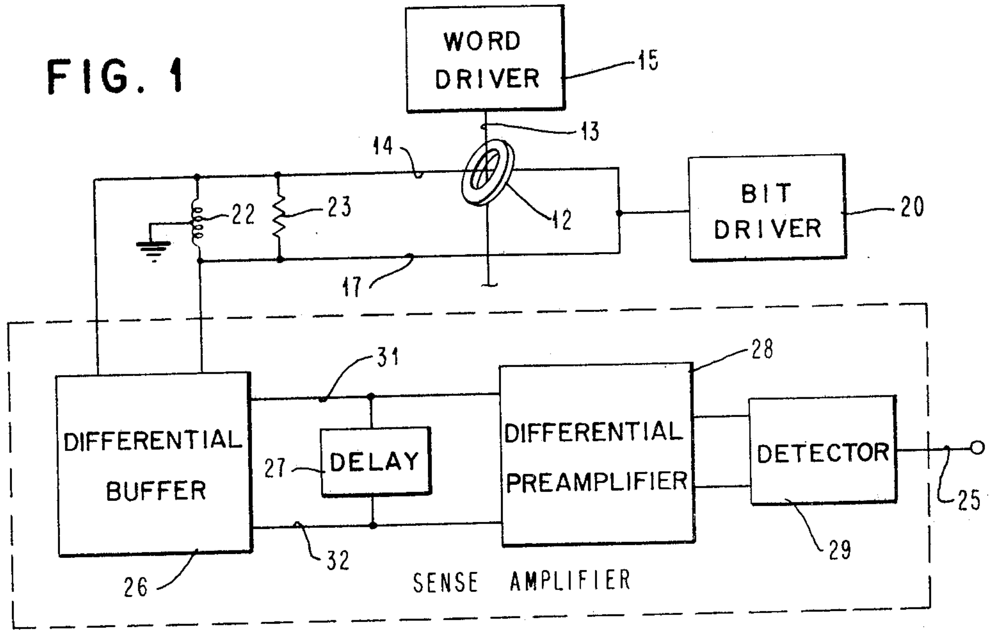
FIG. 1 is a schematic of the preferred embodiment of the sense amplifier of this invention and related parts of a memory.

The memory of FIG. 1 has a large number of storage elements that are illustrated by a single ferrite core 12. Core 12 is threaded by a word wire 13 and a bit-sense wire 14. Wire 13 is connected to be driven by a word driver 15. Wire 14 is paired with a similar wire 17 in a conventional bit current noise cancelling configuration. At one end, each bit-sense wire 14, 17 is connected to be driven by a bit driver 20. At the other end the two wires are connected to ground through a transformer 22. Transformer 22 helps to balance the currents that are applied to the wires 14, 17 by bit driver 20. The transformer is approximately a short circuit to currents that are equal on lines 14 and 17 and it is approximately an open circuit to currents that are not equal. A resistor 23 having the characteristic impedance of the transmission line formed by conductors 14, 17 is connected across lines 14, 17. To the extent that the bit currents are equal (and they are not exactly equal) they do not produce a signal across resistor 23. A signal produced by core 12 appears in opposite polarities on both lines 14, 17 and across resistor 23. The sense amplifier of this invention is connected to receive this signal.

Figure 2:
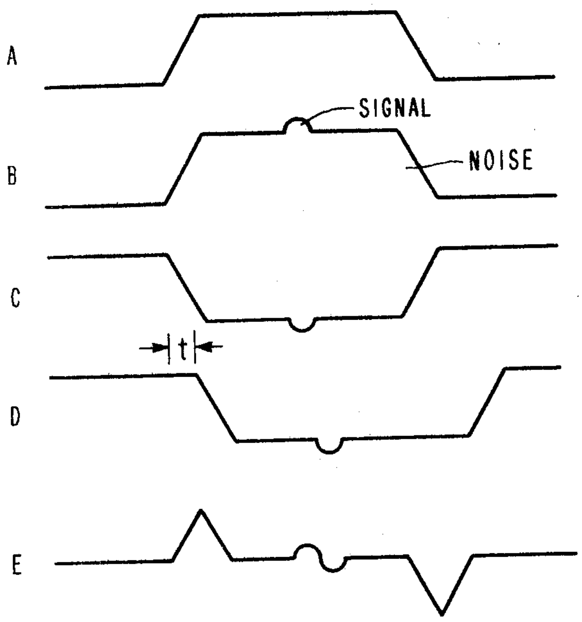
FIG. 2 shows a series of wave forms that illustrate the operation of the sense amplifier and parts of the memory.

In one well known operating mode, both bit driver 20 and word driver 15 are turned on during a read operation. Bit driver 20 produces on each line 14 and 17 the current wave form shown in FIG. 2A. Word driver 15 is turned on slightly after the bit driver so that the core does not receive a full select drive level until the transient noise (not shown in FIG. 2) associated with the bit current has to a suitable extent died out. After this noise has been suitably attenuated, the word driver is turned on to raise the total current drive to the level to switch the core. If the core has stored a one, it will switch to its zero signifying state and the associated flux change will produce on line 14 the small voltage that is shown in FIG. 2B. The wave form of FIG. 2A can be called a pedestal voltage because as other wave forms of FIG. 2 show the signal rides on top of this voltage. FIG. 2A suitably illustrates other noise voltages produced by other operating modes, as has been suggested in the section "Introduction—Background."

A buffer 26 and a delay device 27 are arranged to transform the noise and signals on lines 14 and 17 to a wave form that FIG. 2E shows for the upper terminal 31 of the buffer. This wave form is the combination of other wave forms of FIG. 2 that will be described later. The mirror image of this wave form appears at the lower terminal 32 of the buffer. In the wave form of FIG. 2E, the core signal occurs in a low noise region. Wave form 2E is suitably amplified by a differential preamplifier 28. The output of preamplifier 28 is applied to a detector 29 which produces a voltage at an output 25 that signifies the value stored in core 12. Known detectors perform various operations that enhance the distinction between inputs that represent ones and inputs that represent zeros. For example the detector may receive strobing signals that make the detector inoperable during the time that the noise pulses of FIG. 2E appear.

Buffer 26 is preferably a transistor differential amplifier. It isolates delay device 27 from the wires 14 and 17 of the memory and it substantially removes the common mode voltage that appears at wires 14 and 17. (Transformer 22 also helps to suppress this voltage.) It is simplifying to assume that the buffer does not amplify. FIG. 2B shows the noise and signal that buffer 26 applies to output terminal 31 and FIG. 2C shows the noise and signal that the buffer applies to output terminal 32. The polarities of the noise component is arbitrary; it depends on the voltage unbalance across transformer 22. Because the common mode component of noise is removed, the noise amplitude in the wave forms of FIGS. 2A and 2B is significantly smaller than the noise amplitude on lines 14 and 17.

Figure 3:
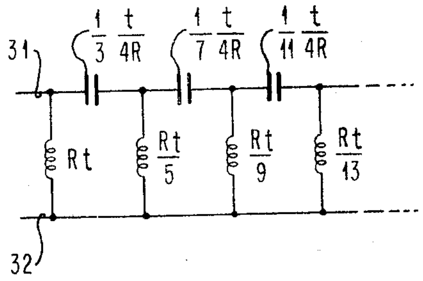
FIG. 3 is a schematic of a delay line that is shown in FIG. 1 in block form.

The input terminals of buffer 26 are connected to lines 14 and 17, delay device 27 may be a transmission line, a delay line, the circuit of FIG. 3 or functionally similar devices.

Wave form 2E is the combination of wave form 2B and a wave form shown in FIG. 2D which is wave form 2C after it has been delayed in traveling from terminal 32 to terminal 31 through delay line 27. The positive noise region in FIG. 2E corresponds to the portion of wave form 2B that appears at terminal 31 before the leading edge of the delayed wave form 2D. The broad region of substantially zero voltage (except for the signal) occurs when wave forms 2B and 2D are opposite in polarity and substantially equal in amplitude and therefore cancel. The negative polarity noise region in FIG. 2E corresponds to the uncancelled portion of the delayed wave form 2D.

By a similar operation, wave form 2B is delayed and combined on line 32 with wave form 2C to produce the mirror of wave form 2E that has already been mentioned.

Thus the effect of the circuit is similar to differentiation. When the voltages applied to terminals 31 and 32 remain invariant for the time of delay line 27, the delayed and undelayed voltages on the two lines become equal and cancel. The delay is made long enough that core signal is not cancelled. Preferably, as FIG. 2 shows, the delay is made the length of the core signal. When the line is made this length, the delayed core signal follows in close succession after the undelayed signal to produce a signal that is twice as long as the original signal.

Since wires 31 and 32 are balanced with respect to ground, the center of the delay line is a virtual ground. Thus the line can be arranged to provide D.C. restore. The delay line can be connected to an appropriate point of the sense amplifier to provide D.C. restore.

The preferred delay device

The sense amplifier as it has been described so far can be constructed of known components. Preferably, however, the delay device is a filter made up of discrete components shown in FIG. 3.

The delay can be provided by a filter whose driving point impedeance has the value $$2R \tanh \frac{St}{2}$$

The term $t$ is the length of the delay (and the width of the core signal). The term 2R is the terminating impedance of the filter, R is the output impedance of buffer 26 between terminal 31 or 32 and ground, and S has the usual Laplace transform connotation. A formal explanation of this delay line is presented in an article "A 2.5D Ferrite Memory Sense Amplifier," in the IEEE Journal of Solid State Circuits, September 1966, pages 58–63. The circuit of FIG. 3 constructed with the values indicated in the drawing provides this impedance if the network of the drawing is extended infinitely as the dashed lines signify. However with only a few sections, the circuit of FIG. 3 gives better performance than a corresponding lumped element delay line with the same number of sections. An equivalent circuit can be constructed with the inductors and capacitors interchanged in the circuit and given appropriate values.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In a memory of the type having bit wires and word wires adapted to be energized for read and write operations and operable to produce a signal and noise accompanying the signal across two points that are electrically balanced with respect to a reference potential, a delay device having a delay substantially equal to the width of a signal produced by the memory, buffer means connecting said delay device across said two points to cancel voltages that are time invariant for longer than said delay, and a differential sense amplifier connected to receive the signal across said delay device, wherein said delay device comprises, a two terminal filter that comprises discrete inductors and capacitors connected to approximate the impedance $$2R \tanh \frac{St}{2}$$

where $t$ is the delay of the delay device, R is the output impedance of each terminal of the buffer means to ground and S has the usual Laplace transform connotation.

2. A memory according to claim 1 wherein said capacitors and inductors form a two terminal ladder network with said inductors providing conductance between said two terminals.

3. A memory according to claim 2 wherein said inductors have values $Rt$, $Rt/5$, $Rt/9$, $Rt/13$ . . . and said capacitors have values $(1/3)(t/4R)$, $(1/7)(t/4R)$, $(1/11)(t/4R)$.

References Cited

UNITED STATES PATENTS

| | | | |
|---|---|---|---|
| 3,034,107 | 5/1962 | Knowles | 340—174 |
| 3,077,584 | 2/1963 | Eschenfelder | 340—174 |
| 3,096,510 | 7/1963 | Lee | 340—174 |
| 3,383,666 | 5/1968 | Mayhew | 340—174 |

STANLEY M. URYNOWICZ, Jr., Primary Examiner